United States Patent [19]
Hsu

[11] Patent Number: 6,079,675
[45] Date of Patent: Jun. 27, 2000

[54] HOSE CARRIER

[76] Inventor: Shih Hao Hsu, No. 426, Dou Yuan East Road, Bi Tou Hsiang, Chang Hua Hsien, 523, Taiwan

[21] Appl. No.: 09/186,935

[22] Filed: Oct. 6, 1998

[51] Int. Cl.[7] ................................................. A62C 13/76
[52] U.S. Cl. ............................ 248/75; 248/68.1; 248/89
[58] Field of Search ................................ 248/75, 78, 89, 248/90, 682; 294/150, 74; 211/106.01, 118, 87.01

[56] References Cited

U.S. PATENT DOCUMENTS

| | | | |
|---|---|---|---|
| 355,924 | 1/1887 | Favel | 248/89 |
| 603,207 | 4/1898 | Ruby | 248/90 |
| 933,069 | 9/1909 | Gibbs | 248/90 |
| 1,177,692 | 4/1916 | Fallis | 294/150 |
| 1,861,806 | 6/1932 | Little et al. | 294/31.2 |
| 2,453,248 | 11/1948 | Much | 248/75 |
| 3,029,933 | 4/1962 | Sutter | 206/577 |
| 3,941,412 | 3/1976 | Carpenter | 294/74 |
| 4,436,267 | 3/1984 | Eads et al. | 248/75 |
| 5,419,362 | 5/1995 | Blackaby | 137/355.16 |
| 5,634,615 | 6/1997 | Shuen | 248/89 |
| 5,699,987 | 12/1997 | Romaneschi et al. | 248/89 |

*Primary Examiner*—Anita M. King
*Attorney, Agent, or Firm*—Charles E. Baxley, Esq.

[57] ABSTRACT

A hose carrier includes an upwardly curved base for winding and for supporting a hose. A holder is secured to one side of the base and a wall secured to the other side of the base for stably retaining the hose in the base. A handle is detachably secured to the holder and the wall for carrying the base. The holder includes an extension for supporting the bottom of the base and includes a hook engaged with the base for securing the base to the holder. The wall has two legs engaged with two pairs of trails formed in the base for further securing the wall to the base.

8 Claims, 4 Drawing Sheets

HOSE CARRIER

BACKGROUND OF THE INVENTION

1. Field of the Invention

The present invention relates to a hose carrier, and more particularly to a hose carrier for holding and for carrying hoses.

2. Description of the Prior Art

Typical hoses are randomly disposed on the ground and may not be suitably stored and carried.

The present invention has arisen to mitigate and/or obviate the afore-described disadvantages of the conventional hoses.

SUMMARY OF THE INVENTION

The primary objective of the present invention is to provide a hose carrier having a foldable structure for storing and transportation purposes.

In accordance with one aspect of the invention, there is provided a hose carrier comprising a base for supporting a hose, the base including a first side and a second side, a holder secured to the first side of the base, a wall secured to the second side of the base, and a handle detachably secured to the holder and the wall for carrying the base.

The first side of the base includes an opening formed therein, the holder includes a hook engaged into the opening of the base for securing the base to the holder.

The base includes a bottom portion, the holder includes an extension laterally extended therefrom for engaging with the bottom portion of the base and for stably supporting the base in place. The extension includes a free end having a panel formed thereon for engaging with the bottom portion of the base. The extension includes a notch close to the holder for allowing the hook to be easily engaged with the base.

The holder includes at least one orifice formed therein for hanging purposes. The second side of the base includes a pair of trails, the wall includes a pair of legs engaged with the trails for securing the wall to the base. The wall includes a pair of arms and a beam secured between the arms, the legs are extended from the arms respectively. One or more fasteners may further be provided for securing the wall to the base and for securing the holder to the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
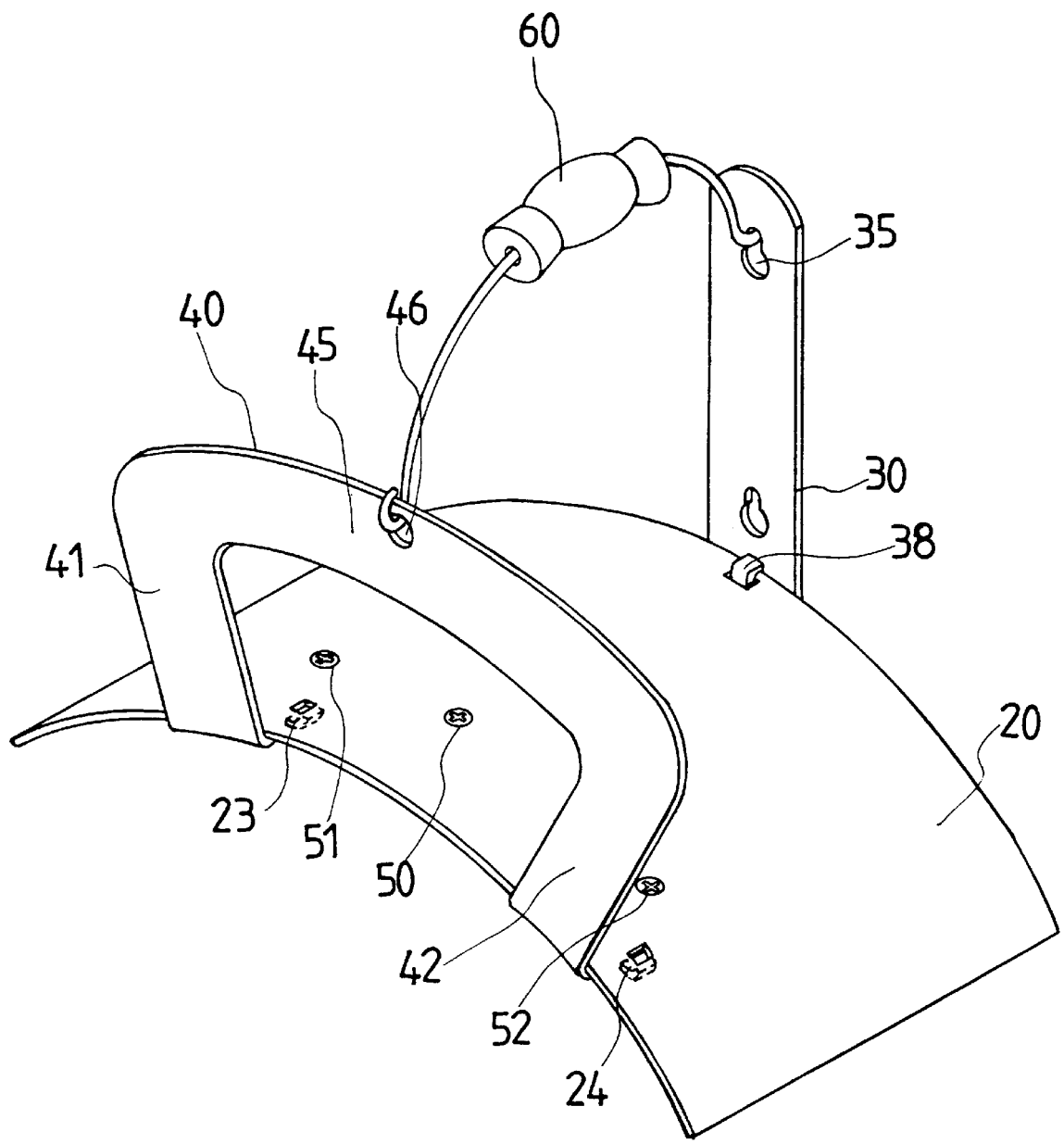
FIG. 1 is a perspective view of a hose carrier in accordance with the present invention.
Figure 2:
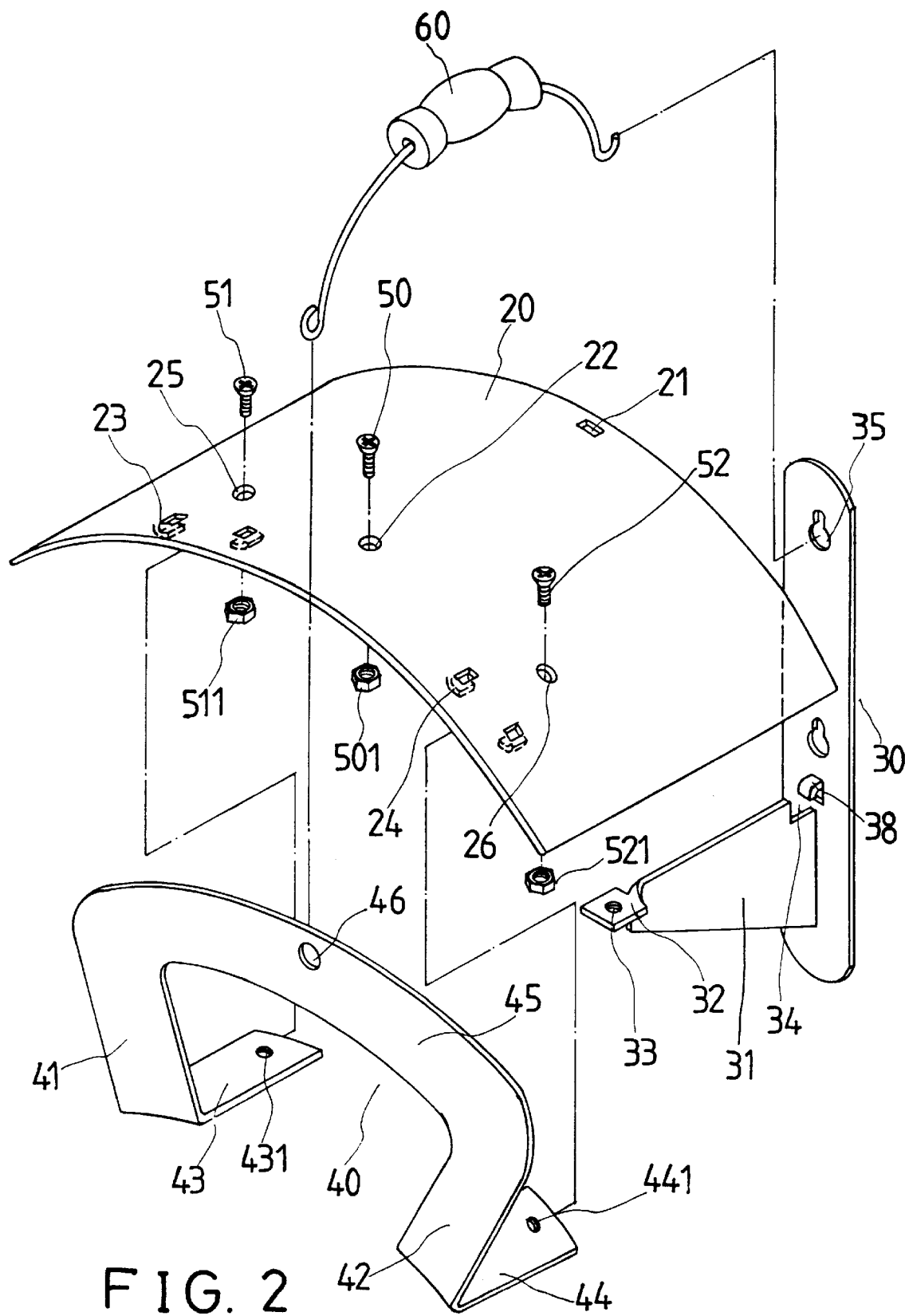
FIG. 2 is an exploded view of the hose carrier.
Figure 4:
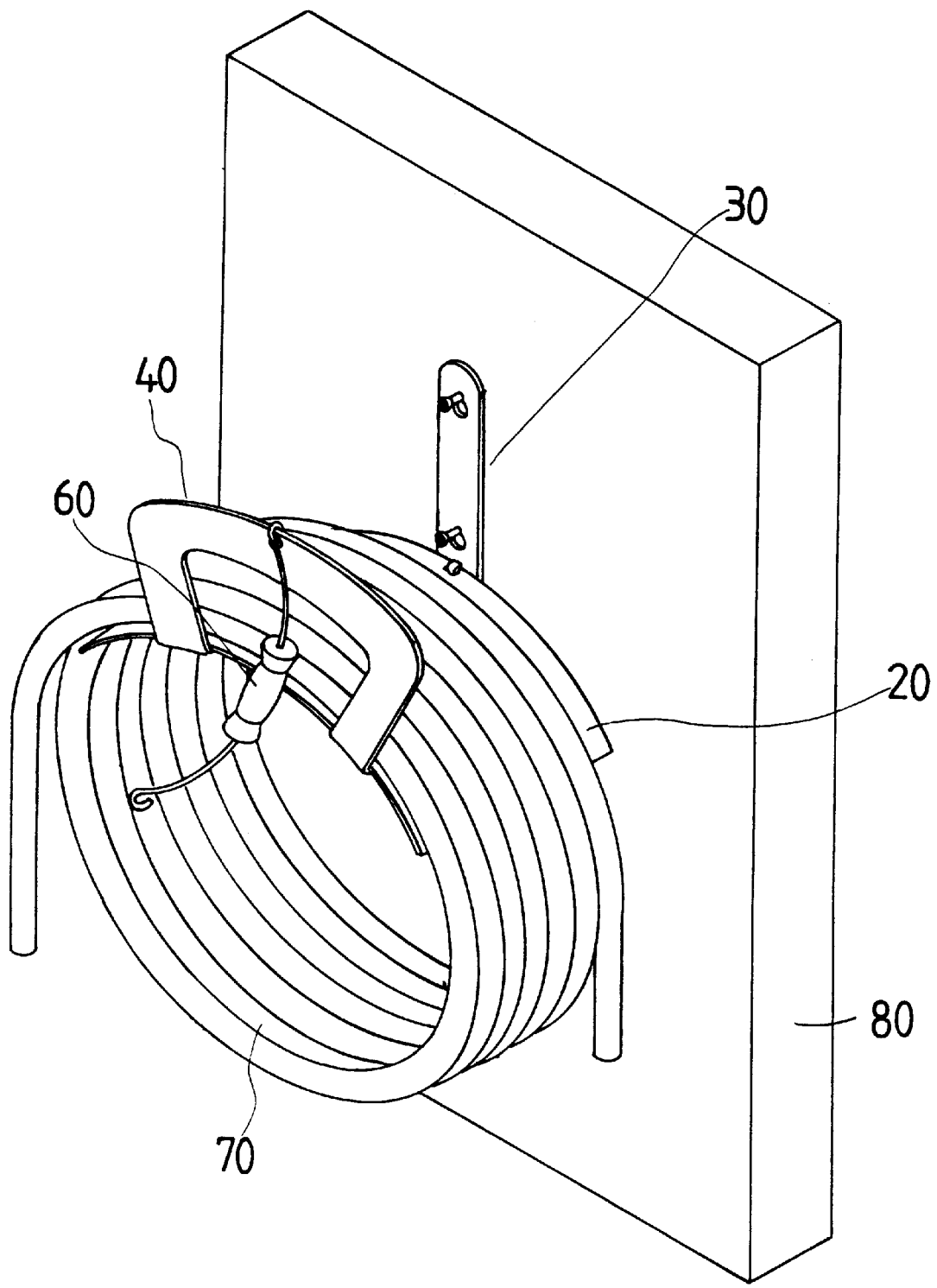

Referring to the drawings, and initially to FIGS. 1 and 2, a hose carrier in accordance with the present invention comprises a base 20 preferably curved upward for winding and supporting the hose 70 thereon. The base 20 includes one side having an opening 21 formed therein and a hole 22 formed in the other side for receiving the bolt 50 and nut 501. A holder 30 includes an extension 31 laterally extended therefrom for supporting the bottom of the base 20 and includes a hook 38 for engaging into the opening 21 and for stably securing the holder 30 to the base 20. The extension 31 includes a notch 34 formed therein and close to the holder 30 for allowing the hook 38 to be easily engaged into the opening 21 of the base 20. The extension 31 includes a free end having a panel 32 for stably supporting the bottom of the base 20. The panel 32 includes a hole 33 for receiving the bolt 50 which may secure the base 20 and the extension 31 of the holder 30 together. The holder 30 includes one or more orifices 35 formed therein for hanging purposes (FIG. 4) or for engaging with one end of a handle 60.

The other side of the base 20 includes two pairs of trails 23, 24 formed in the bottom thereof and includes two holes 25, 26 for receiving fasteners 51, 52 respectively. A wall 40 includes a pair of arms 41, 42 and a beam 45 secured between the arms 41, 42. The arms 41, 42 each has a laterally extended leg 43, 44 for engaging with the trails 23, 24 and for securing the wall 40 to the other side of the base 20. The legs 43, 44 each has a hole 431, 441 for receiving the bolts 51, 52 which may engage with the nuts 511, 521 for further solidly securing the wall 40 to the base 20. The beam 45 includes a hole 46 for receiving the other end of the handle 60.

Figure 3:
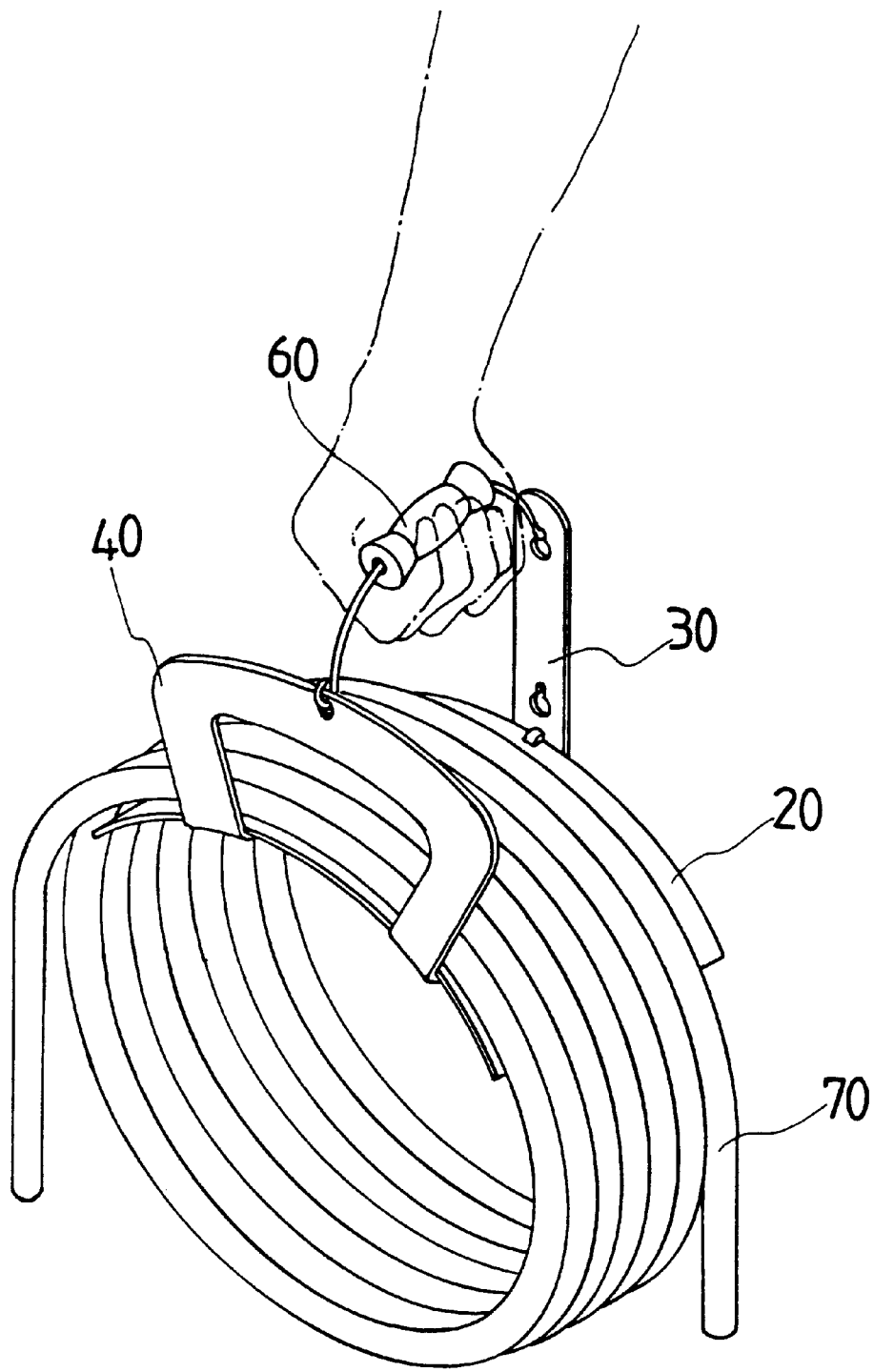
FIGS. 3 and 4 are perspective views illustrating the operation of the hose carrier.

In operation, as shown in FIG. 3, the hose 70 may be wound and supported on the base 20 of the hose carrier and may disassembled for transportation and storing purposes. The holder 30 may be hung onto a support surface 80. The handle 60 may be disengaged from the holder 30 for allowing the hose 70 to be easily engaged onto and disengaged from the base 20.

Accordingly, the hose carrier in accordance with the present invention includes a foldable structure for storing and transportation purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hose carrier comprising:
   a base for supporting a hose, said base including a first side and a second side,
   a holder secured to said first side of said base,
   a wall secured to said second side of said base, and
   a handle detachably secured to said holder and said wall for carrying said base,
   said first side of said base including an opening formed therein, said holder including a hook engaged into said opening of said base for securing said base to said holder.

2. A hose carrier comprising:
   a base for supporting a hose, said base including a first side and a second side,
   a holder secured to said first side of said base,
   a wall secured to said second side of said base, and
   a handle detachably secured to said holder and said wall for carrying said base,
   said base including a bottom portion, said holder including an extension laterally extended therefrom for engaging with said bottom portion of said base and for stably supporting said base in place.

3. The hose carrier according to claim 2, wherein said extension includes a free end having a panel formed thereon for engaging with said bottom portion of said base.

4. The hose carrier according to claim 2, wherein said holder includes a hook engaged with said base for securing said base to said holder, said extension includes a notch formed therein close to said holder for allowing said hook to be easily engaged with said base.

5. The hose carrier according to claim 2 further comprising means for securing said wall to said base.

6. The hose carrier according to claim 2 further comprising means for securing said holder to said base.

7. A hose carrier comprising:

a base for supporting a hose, said base including a first side and a second side, a holder secured to said first side of said base, a wall secured to said second side of said base, and a handle detachably secured to said holder and said wall for carrying said base, said second side of said base including two pairs of trails, said wall including a pair of legs engaged with said trails for securing said wall to said base.

8. The hose carrier according to claim 7, wherein said wall includes a pair of arms and a beam secured between said arms, said legs are extended from said arms respectively.

* * * * *